US011431364B2

(12) United States Patent
Eleftheriadis et al.

(10) Patent No.: US 11,431,364 B2
(45) Date of Patent: Aug. 30, 2022

(54) METHOD AND RADIO BASE STATION FOR HANDLING POWER DISTURBANCE IN THE RADIO BASE STATION

(71) Applicant: Telefonaktiebolaget LM Ericsson (publ), Stockholm (SE)

(72) Inventors: Lackis Eleftheriadis, Gävle (SE); Yifei Jin, Solna (SE); Junaid Shaikh, Sundbyberg (SE); Daniel Lindström, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/274,961

(22) PCT Filed: Sep. 20, 2018

(86) PCT No.: PCT/SE2018/050958
§ 371 (c)(1),
(2) Date: Mar. 10, 2021

(87) PCT Pub. No.: WO2020/060457
PCT Pub. Date: Mar. 26, 2020

(65) Prior Publication Data
US 2022/0038124 A1 Feb. 3, 2022

(51) Int. Cl.
*H04B 1/04* (2006.01)
*H02M 3/04* (2006.01)
(Continued)

(52) U.S. Cl.
CPC ............ *H04B 1/0475* (2013.01); *H02M 3/04* (2013.01); *H02M 7/04* (2013.01); *H04W 88/085* (2013.01)

(58) Field of Classification Search
CPC ........ H04B 1/0475; H02M 3/04; H02M 7/04; H04W 88/085
(Continued)

(56) References Cited

U.S. PATENT DOCUMENTS

2007/0196099 A1* 8/2007 Ishiyama ........... H04N 1/32795
396/301
2008/0157895 A1* 7/2008 Immonen .................. H03F 3/68
332/155
(Continued)

FOREIGN PATENT DOCUMENTS

WO 2017095279 A1 6/2017

OTHER PUBLICATIONS

International Search Report and Written Opinion of the International Searching Authority for PCT International Application No. PCT/SE2018/050958 dated May 17, 2019.

*Primary Examiner* — Emmanuel Bayard
(74) *Attorney, Agent, or Firm* — Sage Patent Group

(57) ABSTRACT

A method and radio base station for handling a power disturbance caused by a radio unit of the radio base station. The method comprises: obtaining scheduling information of data traffic associated with the RU; comparing the power disturbance with one or more first thresholds, wherein the power disturbance is caused by the RU adapted to handle the data traffic according to the scheduling information; and adjusting a switching frequency of a direct current to direct current, DC/DC, converter based on the comparison, wherein the DC/DC converter is comprised in the RU to power the RU.

16 Claims, 9 Drawing Sheets

(51) Int. Cl.
*H02M 7/04* (2006.01)
*H04W 88/08* (2009.01)

(58) Field of Classification Search
USPC .................................. 375/260, 296, 350
See application file for complete search history.

(56) References Cited

U.S. PATENT DOCUMENTS

| | | |
|---|---|---|
| 2013/0307339 A1 | 11/2013 | Subramanium et al. |
| 2018/0269717 A1* | 9/2018 | Shijo ..................... H02J 50/10 |
| 2019/0013734 A1* | 1/2019 | Nakashima ........... H02M 3/156 |
| 2020/0280325 A1* | 9/2020 | Zhang ................... H03F 1/0211 |

* cited by examiner

METHOD AND RADIO BASE STATION FOR HANDLING POWER DISTURBANCE IN THE RADIO BASE STATION

CROSS REFERENCE TO RELATED APPLICATION

This application is a 35 U.S.C. § 371 national stage application of PCT International Application No. PCT/SE2018/050958 filed on Sep. 20, 2018, the disclosure and content of which is incorporated by reference herein in its entirety.

TECHNICAL FIELD

Embodiments herein relate to a method and a radio base station. Furthermore, a computer program product and a computer readable storage medium are also provided herein. In particular, embodiments herein relate to handling a power disturbance caused by a radio unit (RU) of the radio base station.

BACKGROUND

In a typical wireless communication network, wireless devices, also known as wireless communication devices, mobile stations, stations (STA) and/or user equipments (UE), communicate via a Radio Access Network (RAN) to one or more core networks (CNs). The RAN covers a geographical area which is divided into service areas or cells, with each service area or cell being served by a radio base station such as a radio access node e.g. a Wi-Fi access point or a radio base station (RBS), which in some networks may also be denoted, for example, a NodeB (NB), an enhanced NodeB (eNodeB), or a gNodeB (gNB). A service area or cell is a geographical area where radio coverage is provided by the radio base station. The radio base station communicates over an air interface operating on radio frequencies with the wireless device within range of the radio base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks, and investigate enhanced data rate and radio capacity. In some RANs, e.g. as in UTRAN, several radio base stations may be connected, e.g. by landlines or microwave, to a controller node, such as a radio network controller (RNC) or a base station controller (BSC), which supervises and coordinates various activities of the plural radio base stations connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio base stations are directly connected to the EPC core network rather than to RNCs. In general, in E-UTRAN/LTE the functions of an RNC are distributed between the radio base stations, e.g. eNodeBs in LTE, and the core network. As such, the RAN of an EPS has an essentially "flat" architecture comprising radio base stations connected directly to one or more core networks, i.e., they are not connected to RNCs. To compensate for that, the E-UTRAN specification defines a direct interface between the radio base stations, this interface being denoted the X2 interface. New generation radio (NR) is a new radio access technology being standardized in 3GPP.

The radio base station may be powered by a power supply unit (PSU) which comprises an alternating current to direct current (AC/DC) converter, and one or more direct current to direct current (DC/DC) converters adapted to power one or more power amplifiers (PAs) in a radio communication unit also referred to as radio unit (RU).

A power bus, which is also referred to herein as, a busbar or an electrical bus may be employed between the AC/DC converter and the one or more DC/DC converters. A power disturbance on a forwarding and/or return power line of the power bus may appear when the radio base station performs an antenna muting and/or carrier aggregation.

The antenna muting allows the RU to turn ON/OFF a transmitter (TX) based on the scheduled data traffic. The antenna muting turns ON/OFF a PA to save power while data traffic is low.

The carrier aggregation allows schedule data traffic between frequency bands or spectrums. The carrier aggregation distributes the data traffic towards different bands or spectrums for higher and faster data transmission. Activation/deactivation trigger of the carrier aggregation may be:

Need based: Activate/deactivate based on buffer occupancy

Coverage based
1) Deactivate based on poor Secondary Cell (SCell) Channel Quality Indicator (CQI)
2) Polling when out of SCell coverage Based on a prohibit timer to avoid ping pong.

When a baseband unit (BBU) allocates via a scheduler function the data traffic towards different TXs, the radio base station may suffer from a power disturbance generated from turning ON/OFF of PAs in a RU with, e.g. 4 transmitters (TXs) and 4 receivers (RXs). At the same time changing of bands or spectrums may also generate the power disturbance. The changing of bands or spectrums normally generates power disturbance on a forwarding and/or a return power line of the power bus, and creates different radio frequency harmonics. That is basically because different bands or spectrums consume different power. The generated power disturbance may also be spread to other RUs within one sector.

A solution for handling power disturbance caused by a radio unit of the radio base station is therefore needed.

SUMMARY

An object of embodiments herein is to provide a mechanism for improving performance of the wireless communication network. Particularly to provide a method and radio base station for handling a power disturbance caused by a radio unit of the radio base station.

According to an aspect the object is achieved by providing a method performed by a radio base station, for handling a power disturbance caused by a RU of the radio base station. The radio base station obtains scheduling information of data traffic associated with the RU. The radio base station compares the power disturbance with one or more first thresholds. The power disturbance is caused by the RU adapted to handle the data traffic according to the scheduling information. The radio base station also adjusts, based on the comparison, a switching frequency of a DC/DC converter that is comprised in the RU to power the RU.

According to still another aspect the object is achieved by providing a radio base station for handling a power disturbance caused by a RU of the radio base station. The radio base station is configured to obtain scheduling information of data traffic associated with the RU. The radio base station is configured to compare the power disturbance with one or more first thresholds. The power disturbance is caused by the RU adapted to handle the data traffic according to the scheduling information. The radio base station is also configured to adjust, based on the comparison, a switching frequency of a DC/DC converter that is comprised in the RU to power the RU.

It is furthermore provided herein a computer program product comprising instructions, which, when executed on at least one processor, cause the at least one processor to carry out any of the methods above, as performed by the radio base station. It is additionally provided herein a computer-readable storage medium, having stored thereon a computer program product comprising instructions which, when executed on at least one processor, cause the at least one processor to carry out the method according to any of the methods above, as performed by the radio base station.

According to still another aspect the object is achieved by providing a radio base station comprising a RU adapted to handle data traffic according to scheduling information, and processing circuitry configured to obtain scheduling information of data traffic associated with the RU. The processing circuitry is configured to compare the power disturbance with one or more first thresholds. The power disturbance is caused by the RU adapted to handle the data traffic according to the scheduling information. The processing circuitry is also configured to adjust, based on the comparison, a switching frequency of a DC/DC converter that is comprised in the RU to power the RU.

Embodiments herein provide methods to handle the power disturbance caused by the RU in the radio base station, and no filter capacitor is needed in the RU and/or a PSU thereby reducing hardware cost. Due to the above handling of the power disturbance the reliability and robustness of the RU is improved. Additionally, improvements in communication efficiency may be achieved.

BRIEF DESCRIPTION OF THE DRAWINGS

Embodiments will now be described in more detail in relation to the enclosed drawings, in which.

DETAILED DESCRIPTION

Figure 1:
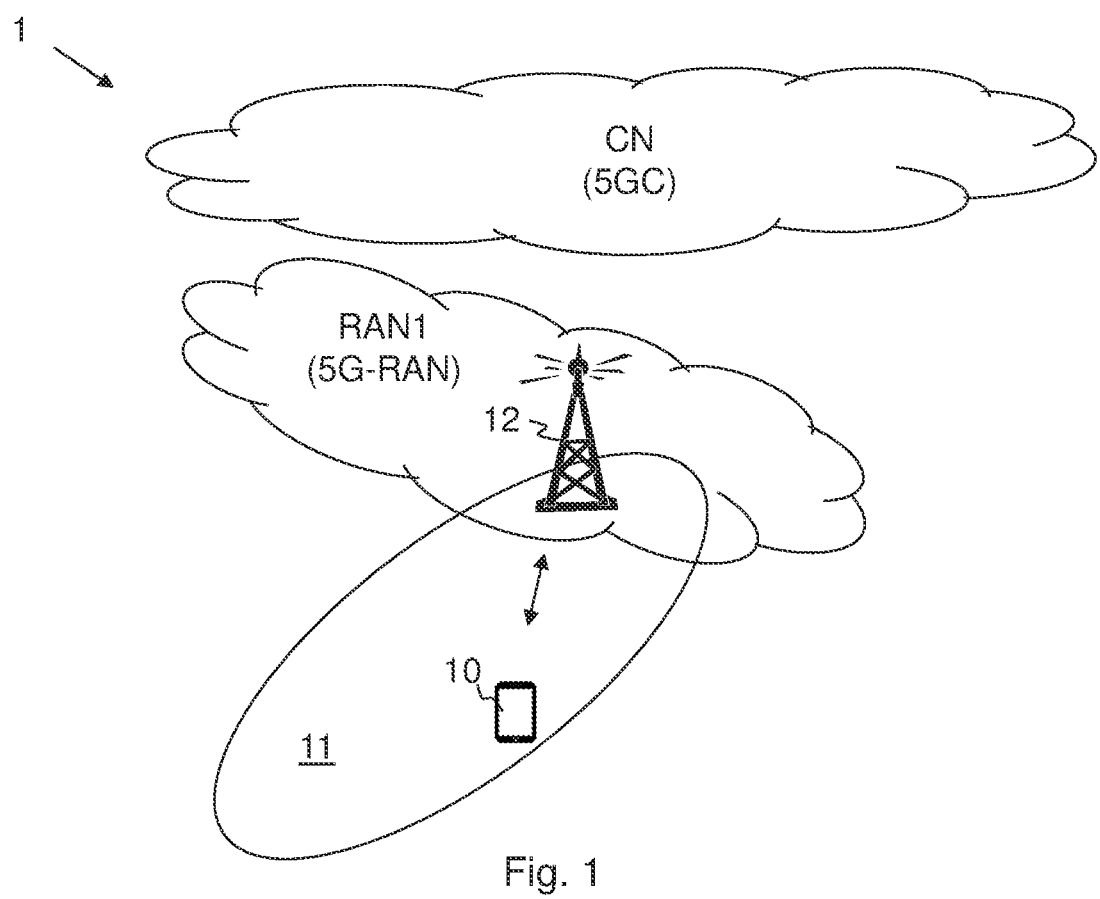
FIG. 1 is a schematic overview depicting a wireless communication network according to embodiments herein.

FIG. 1 is a schematic overview depicting a wireless communication network 1 comprising one or more RANs, e.g. a first RAN (RAN1), connected to one or more CNs, e.g. a 5G core network (5GCs). The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices, e.g. a wireless device 10 such as a mobile station, a non-access point (non-AP) station (STA), a STA, a user equipment (UE) and/or a wireless terminal, are connected via the one or more RANs, to the one or more CNs, e.g. 5GCs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area. The wireless device searches for carriers using a carrier raster. The carrier raster indicating possible frequency positions of a carrier for the wireless device The wireless communication network 1 comprises a radio base station 12. The radio base station 12 is exemplified herein as a RAN node providing radio coverage over a geographical area, a service area 11, of a radio access technology (RAT), such as NR, LTE, UMTS, Wi-Fi or similar. The radio base station 12 may be a radio access network node such as an access point, e.g. a wireless local area network (WLAN) access point or an Access Point Station (AP STA), an access controller. Examples of the radio base station 12 may also be a NodeB, a gNodeB, an evolved Node B (eNB, eNodeB), a base transceiver station, Access Point Base Station, base station router, a transmission arrangement of a radio base station, a stand-alone access point or any other network unit capable of serving a wireless device 10 within the service area served by the radio base station 12 depending e.g. on the radio access technology and terminology used and may be denoted as a receiving radio base station.

Figure 2:
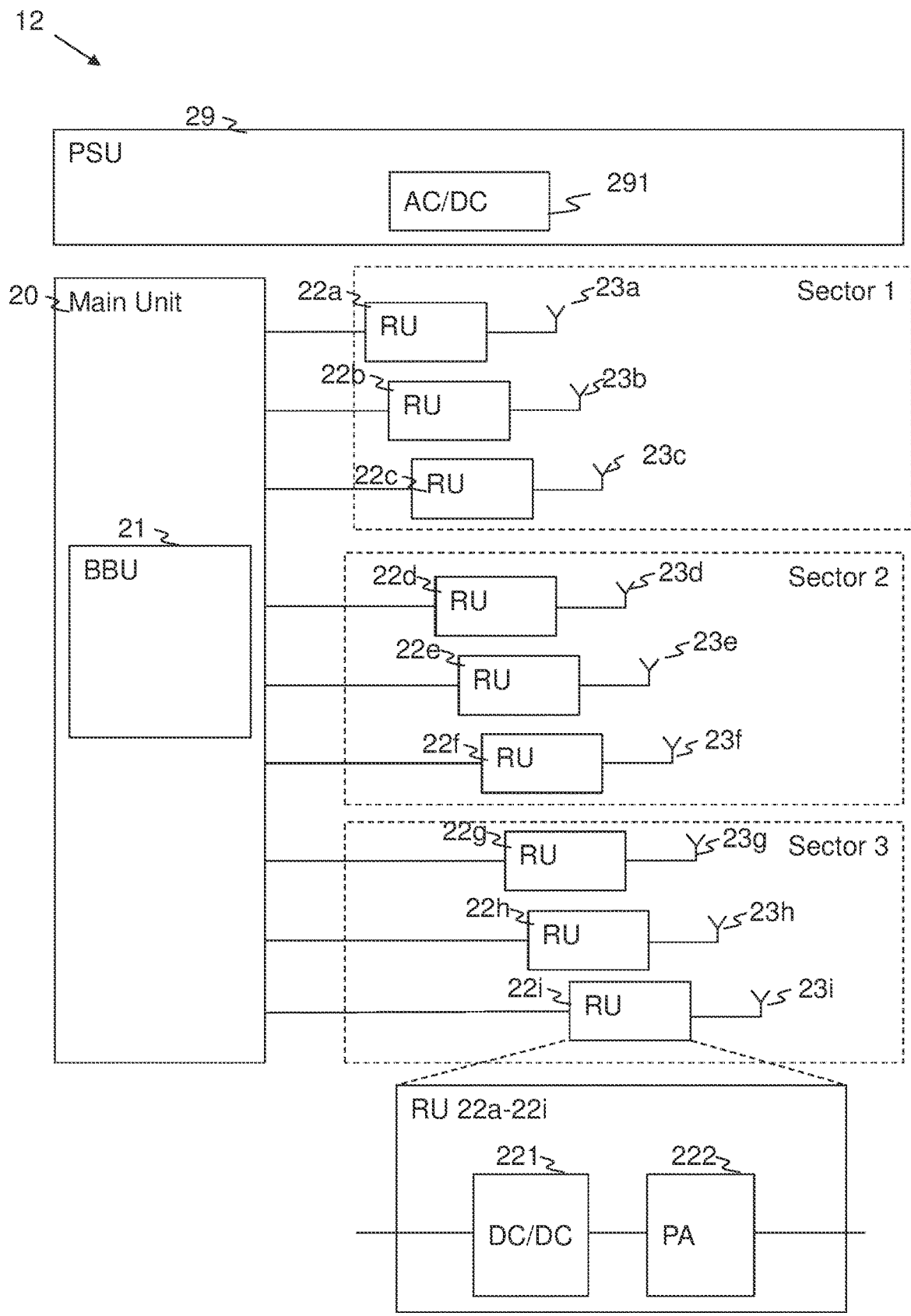
FIG. 2 is a schematic overview depicting a main-remote radio base station according to embodiments herein.

As shown in FIG. 2, a radio base station may comprise one or more radio units (RUs) 22a-22i, one or more antennas 23a-23i, a control unit (not shown) and a BBU 21 for performing base band signal processing. Each RU may correspond to one antenna.

It is noted that the embodiments herein apply to both centralized and main-remote radio base station. Just as an example, a main-remote radio base station is shown in FIG. 2.

The main-remote radio base station, may split the BBU 21 and the RUs 22a-22i. A main unit (MU) 20 may comprise the BBU 21. As an example, a corresponding optical link may be employed to connect the MU 20 with a respective RUs 22a-22i. Each optical link may comprise, for example, one optical fiber for carrying digital information downlink from the MU 20 to the RUs 22a-22i, and another optical fiber for carrying digital information uplink from the RUs 22a-22i to the MU 20.

The RUs 22a-22i may also be referred to as a radio remote unit (RRU) in a context of a main-remote radio base station or a radio communication unit. The one or more RUs 22a-22i may be configured to convert between baseband and radio frequencies and transmit and receive signals over one or more antennas, e.g. multiple-input and multiple-output (MIMO) antennas 23a-23i. Each RU 22a-22i serves a certain geographic area or cell. As can be seen from FIG. 2, one or more RUs may be deployed in one sector, e.g. sector 1-sector 3. The one or more RUs in the same sector may have the same characteristics, e.g. serving the same direction. The number of RUs in each sector may be different. For instance, each sector may comprise three RUs, i.e. sector 1 may comprise RUs 22a-22c, sector 2 may comprise three RUs 22d-22f, and sector 3 may comprise RUs 22g-22i.

Each RU 22a-22i may comprise one or more radio frequency (RF) communication units, e.g. TXs and/or RXs. When an antenna, e.g. antenna 23a, receives a radio signal transmitted from the wireless device 10, the RF unit may demodulate the received radio signal into a baseband signal. The RF unit may also modulate a baseband signal destined to the wireless device 10, which is supplied from the BBU 21, into a transmission signal, i.e. radio signal. The RF unit may further control the transmission power of a radio signal that is transmitted from the antenna, e.g. antenna 23a, to the wireless device 10.

The antenna, e.g. antenna 23a, is configured to perform radio communications with the wireless device 10. The antenna, e.g. antenna 23a, may also receive radio signals transmitted from another radio base station. The control unit may set communication configurations for the RUs 22a-22i and the BBU 21. The BBU 21 may digitally process signals on a radio channel and a logical channel. For example, the BBU 21 processes a baseband signal supplied from the RF unit into a digital signal. The BBU 21 may supply the resulting digital baseband signal to the control unit. The BBU 21 may also digitally process a signal for the wireless device 10, which is supplied from the control unit, in order to generate a baseband signal that will be sent to the wireless device 10. The BBU 21 may supply the RF unit with the generated baseband signal that will be sent to the wireless device 10.

The radio base station 10 may be powered by a PSU 29, which comprises an AC/DC converter 291. Each RU 22a-22i may also comprise one PA 222 and one DC/DC converter 221 adapted to power the PA 222. Each PA 222 may be associated with one or more TXs and/or RXs. In the conventional PSU 29, capacitors are usually used to smooth or filter a pulsating DC output after rectification so that a nearly constant DC voltage is supplied. The pulsating output of the rectifiers has an average DC value and an AC portion that is called ripple voltage. Filter capacitors reduce the amount of ripple voltage to a level that is acceptable. However the filter capacitors may be excluded according to some embodiments herein.

As part of developing embodiments herein, a problem will first be identified and shortly discussed.

Figure 3:
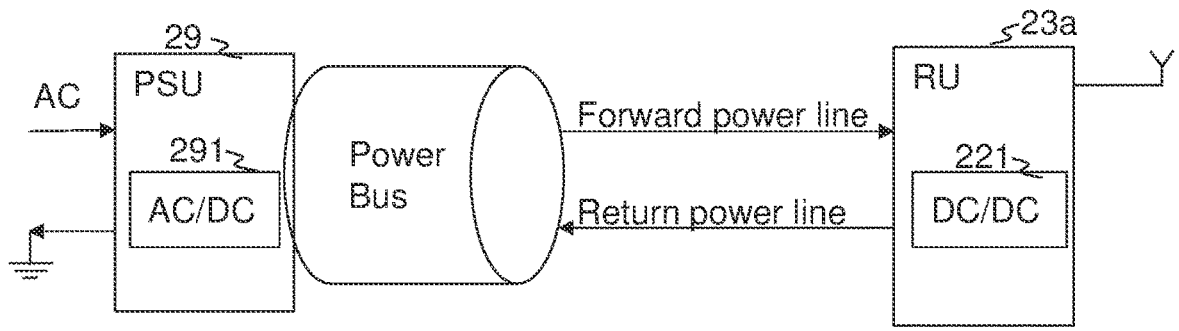
FIG. 3 is a schematic overview depicting a forwarding and a return power line of a power bus where a power disturbance propagates according to embodiments herein.

Embodiments herein are related to handling, e.g. reducing, a power disturbance caused by a RU, e.g. RU 22a, on a forwarding and/or return power lines of a power bus as shown in FIG. 3.

According to the embodiments herein handling, e.g. reducing, the power disturbance is achieved by adjusting a switching frequency of the DC/DC converter 221. Adjusting the switching frequency of the DC/DC converter 221 may be performed based on the scheduling information, e.g. every Time Transmission Interval (TTI) a comparison of a power disturbance with a threshold is performed, wherein the power disturbance is caused by the RU. By adjusting the switching frequency of the DC/DC converter 221 which is comprised in the RU to power the RU, e.g. RU 22a-22i, the power disturbance caused by one RU on another RU on the power bus may be compensated. Adjusting the switching frequency of the DC/DC converter 221 may be regarded as a RU level or sector level adjustment of the power disturbance, due to the adjustment being performed within one RU or one sector.

By increasing switching frequency of the DC/DC convertor 221 in the RU 22a-22i, the power disturbance on the power line, e.g. the return power line, will be decreased. When the DC/DC convertor 221 is switched and modulated, the power disturbance cannot be spread onto the power bus, thereby the more often the DC/DC convertor 221 is switched and modulated the fewer power disturbances are spread.

The switching frequency of the DC/DC convertor 221 may be limited between 300 kHZ- and 600 kHZ, or in the future maybe 1 MHz. However, even when adjusting the switching frequency of the DC/DC converter 221 to the maximum frequency, the power disturbance after the adjusting may sometimes still be above the maximum threshold. In this case, according to some embodiments, a switching frequency of the AC/DC converter 291 may be adjusted in order to decrease the power disturbance.

Alternatively or additionally, handling, e.g. reducing, power disturbance may also be achieved by adjusting a switching frequency of the AC/DC converter 291. Adjusting the switching frequency of the AC/DC converter 291 may be performed based on the scheduling information, e.g. every TTI. Adjusting of the switching frequency of the AC/DC converter 291 may be performed on either one respective sector or all sectors. Due to the adjusting of the switching frequency of the AC/DC converter 291 is associated with the power bus, this may also be regarded as a radio base station level adjustment of the power disturbance.

According to some embodiments, a machine learning (ML) algorithm may be used to train and learn how to adjust the frequency of the DC/DC converter 221 and/or the AC/DC converter 291. The ML algorithm may then be used at a later time. The ML algorithm may, e.g. one TTI in advance, obtain the scheduling information of data traffic from the scheduler, and adjust the switching frequency of the DC/DC converter 221 and/or AC/DC converter 291 when transmitting or receiving the data traffic. By doing so, a dynamic, automated and real-time adjustment of the switching frequency may be achieved.

Figure 4:
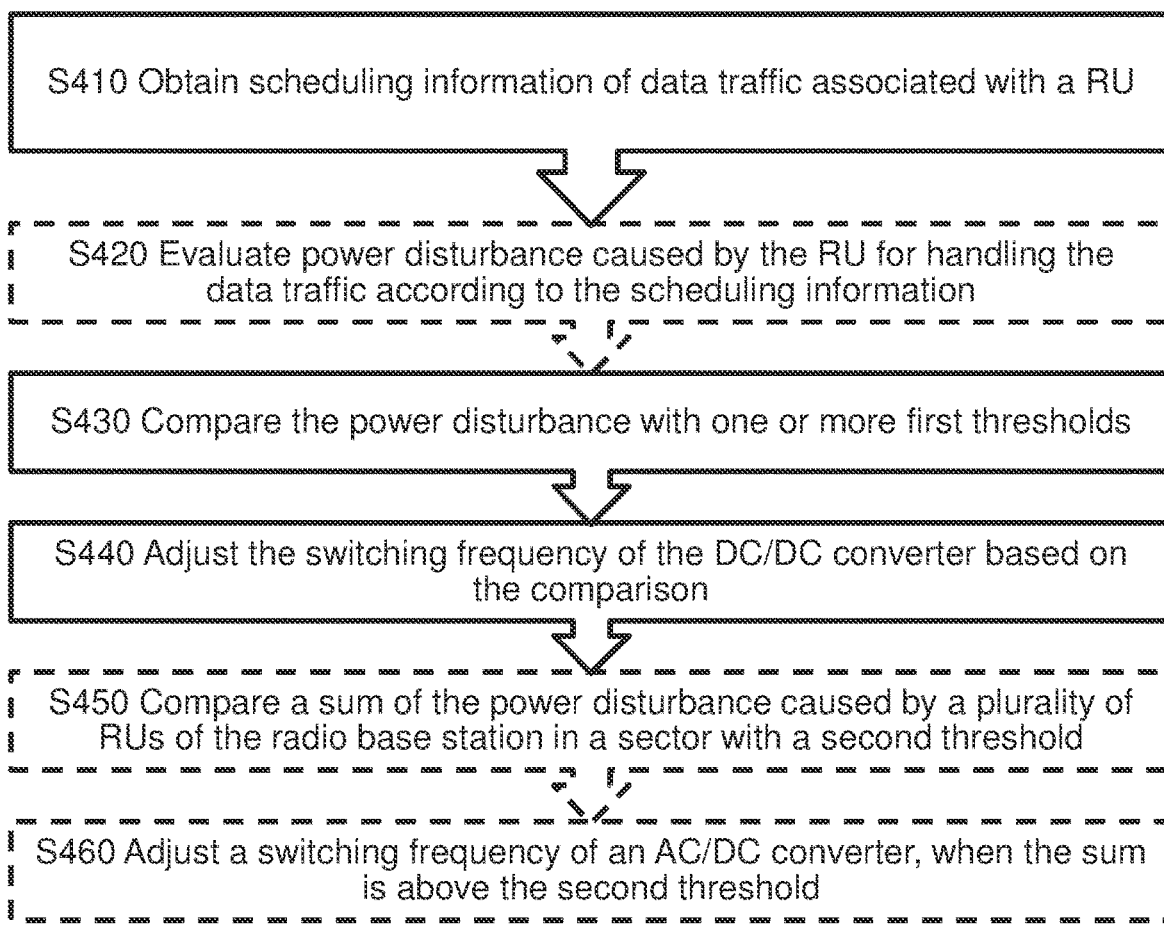
FIG. 4 is a flowchart depicting methods performed by a radio base station according to embodiments herein.

The method actions performed by the radio base station 12 for handling the power disturbance caused by the RU, e.g. RU 22a of the radio base station 12 according to embodiments herein will now be described with reference to a flowchart depicted in FIG. 4. The actions do not have to be taken in the order stated below, but may be taken in any suitable order. Actions performed in some embodiments may be marked with dashed boxes.

As mentioned above, the radio base station 12 may comprise one or more RUs 22a-22i, the method actions may be performed with respect to each RU 22a-22i. In embodiments herein, the RU 22a will be used for the illustration purpose.

Action S410. The radio base station 12 obtains scheduling information of data traffic associated with the RU 22a.

The data traffic may comprise any user data or control signal e.g. information about muting an antenna or using carrier aggregation.

The scheduling information may when carrier aggregation is involved comprise allocated carriers information, which RU will be used to transceive the data traffic and/or antenna muting information. As mentioned above, the obtained scheduling information of data traffic may additionally be associated with other RUs 22b-22i.

Based on the scheduling information, the radio base station 12 may obtain a switching frequency of the DC/DC converter 221, e.g. in one TTI.

The obtained scheduling information of data traffic may normally be associated with all RUs 22a-22i, not only the RU 22a, the embodiments herein may be performed with respect to each of the RUs 22a-22i though only the RU 22a is used as an example.

Action S420. The radio base station 12 may evaluate the power disturbance caused by the RU 22a when handling the data traffic according to the scheduling information.

As mentioned above, power disturbance may be caused by the RUs 22a-22i which are adapted to handle data traffic according to, e.g. antenna muting and carrier aggregation. For example, when antenna muting is activated the radio base station 12 may suffer from a power disturbance on the power bus generated from turning the PAs 222 ON/OFF in a RU 22a-22i. Additionally, when the carrier aggregation is activated the changing of bands or spectrums may also generate power disturbances.

A power disturbance may appear in a voltage, which is also referred to as a voltage disturbance, and/or a variation of a frequency, which is also referred to as a frequency disturbance. Also the power disturbance may be on the forwarding and/or the return power line.

The evaluation may be performed according to any prior art technologies.

Action S430. The radio base station 12 compares the power disturbance with one or more first thresholds, wherein the power disturbance is caused by the RU 22a adapted to handle the data traffic according to the scheduling information.

The one or more first threshold may be configured from a default setting from factory, or from an operating and support system (OSS). Later on, by using ML algorithm the first one or more first threshold may be updated after training.

In case there is a plurality of first thresholds, they may comprise a minimum threshold and a maximum threshold. If there is only one first threshold, it may be a maximum threshold.

The one or more first thresholds may be voltage disturbance thresholds, or frequency disturbance thresholds. The one or more first thresholds may be associated with an input of each RU, 22a-22i. Taking the voltage disturbance thresholds as an example, if an ordinary input voltage of the RU 22a is −54.5 VDC, the maximum threshold may be configured as −55 VDC. The threshold(s) may be dynamically configured based on the scheduling information. If more data traffic is scheduled the threshold(s) may increase accordingly.

The RU 22a may be operable in different Radio Access Technologies (RAT), and the one or more first thresholds may be configured per RAT. For instance, the RU 22a is operating in GSM, the RU 22b is operating in LTE, and the RU 22c is operating in 5G. The one or more first thresholds may be configured per RAT. In other words, the one or more first thresholds may be different with respect to different RATs.

Action S440. The radio base station 12 adjusts the switching frequency of DC/DC converter 221 based on the comparison, wherein the DC/DC converter 221 is comprised in the RU 22a to power the RU 22a.

According to an implementation form, the radio base station 12 may increase the switching frequency of the DC/DC converter 221 when the power disturbance is above the maximum threshold. A technical advantage of this implementation is that the power disturbance on the power line, e.g. return power line, will be decreased.

The radio base station 12 may also decrease the switching frequency of the DC/DC converter 221 when the power disturbance is below the minimum threshold. When the power disturbance is below a minimum threshold, it means that the power disturbance may be in a reasonable range. A technical advantage of decreasing the switching frequency of the DC/DC converter 221 is that more power will be saved.

The power disturbance by one sector, e.g. sector 1 may be spread to other sectors, e.g. sectors 2-3. In order to compensate the spreading of power disturbance to other sectors, the radio base station 12 may further perform actions S450-S460 as below. It is noted that the actions S450-S460 may be performed for all sectors 1-3 one by one.

Action S450. The radio base station 12 may compare a sum of the power disturbance caused by a plurality of RUs, e.g. RUs 22a-22c, of the radio base station in a sector, e.g. sector 1, with a second threshold.

The second threshold may be configured based on a default setting from factory, or from an operating and support system (OSS). Later on, by using ML algorithm the second threshold can be proposed by a trained model, and be changed. The second threshold may be obtained after a train and learn process of a ML algorithm.

Action S460. The radio base station 12 may further adjust a switching frequency of the AC/DC converter 291 adapted to power the radio base station 12, when a sum of power disturbances caused by a plurality of RUs, e.g. RUs 22a-22c of the radio base station in a sector, e.g. sector 1, is above the second threshold.

Embodiments herein enable the radio base station 12 to handle power disturbances. No filter capacitor is needed for a RU and/or a PSU, which may result in reduced hardware costs. Due to the above handling of the power disturbance, the reliability and robustness of the RU is improved.

Figure 5:
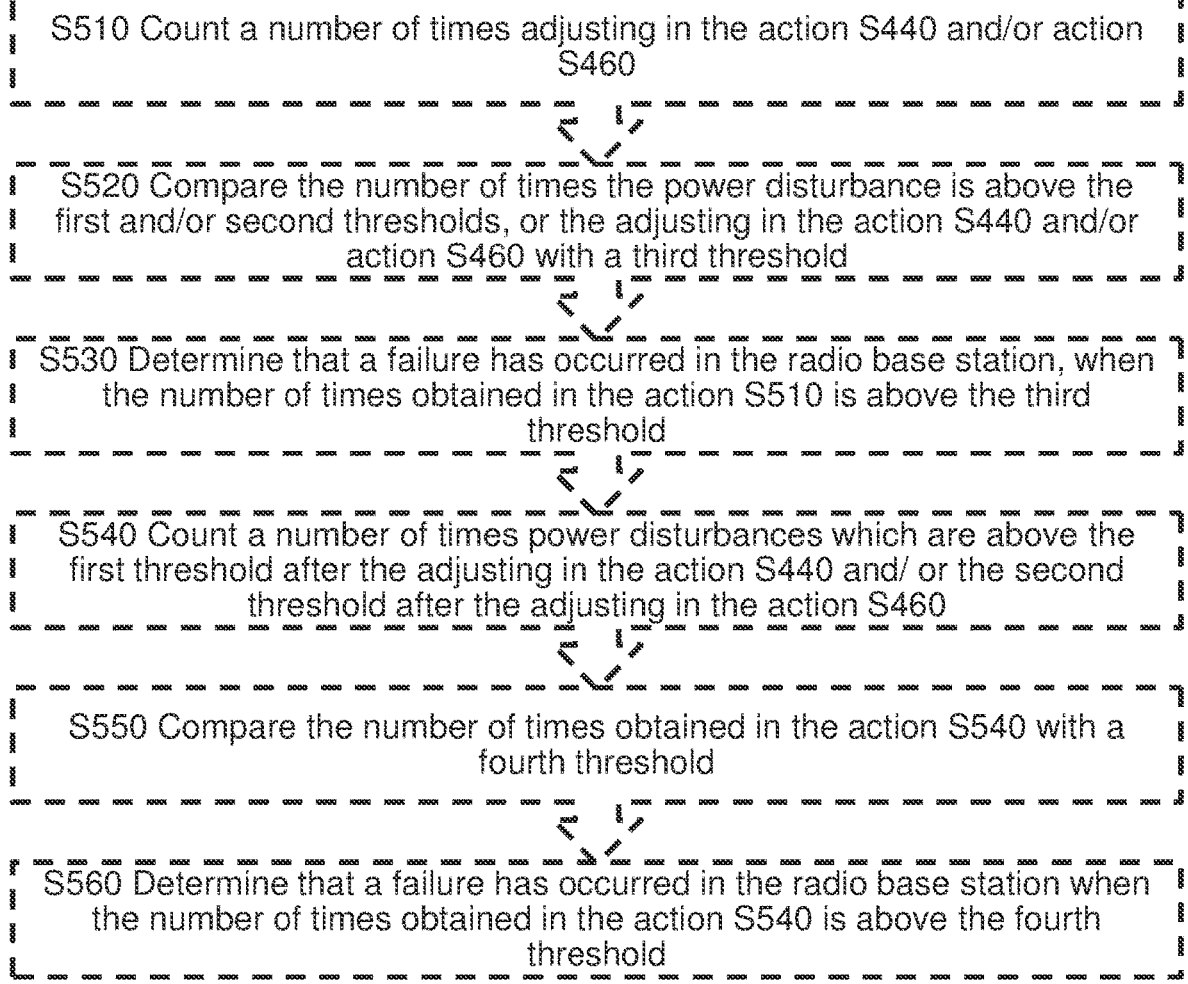
FIG. 5 is a flowchart depicting methods performed by a radio base station according to embodiments herein.
Figure 6:
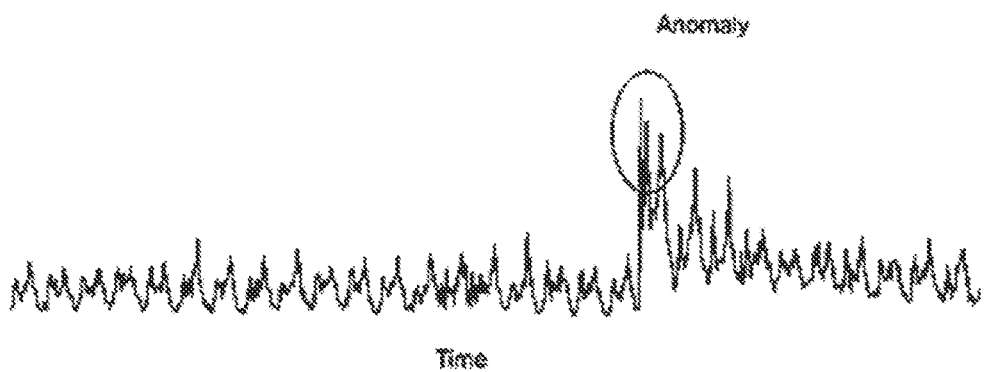
FIG. 6 depicts a detected anomaly according to embodiments herein.

The method actions performed by a radio base station 12 for handling a power disturbance caused by each RU, e.g. RU 22a, of the radio base station 12 may also comprise detecting a failure based on the power disturbance. The method actions for detecting the failure according to embodiments herein will now be described with reference to a flowchart depicted in FIG. 5. The actions do not have to be taken in the order stated below, but may be taken in any suitable order. Actions performed in some embodiments may be marked with dashed boxes.

Action S510. The radio base station 12 may count how many times the power disturbances are above the first and/or second thresholds, or how many times the adjusting in the action S440 and/or action S460 have been performed. The counting may be performed in a first time period, e.g. 5 TTIs.

It would be preferable to count how many times the frequency adjustments are performed in both actions S440 and S460, in order to include all adjustments.

Action S520. The radio base station 12 may compare the number of times the power disturbance is above the first and/or second thresholds, or the number of times the adjusting in the action S440 and/or action S460 have been performed, with a third threshold.

The third threshold may be configured based on a time duration of the first time period. For instance, the threshold may be five if the first time period is 5 TTIs. The third threshold may be updated by the ML algorithm.

Action S530. The radio base station 12 determines that a failure has occurred in the radio base station 12, when the number of times obtained in the action S510 is above the third threshold.

The failure may comprise a hardware, software and/or capacitor fault. Examples of hardware failure may comprise DC/DC converter faults, PA or other capacitor-related faults at the RU. Examples of software fault may comprise wrong configuration of carriers within the same site or sector. The capacitor-related faults may comprise a capacitor dry out.

Action S540. The radio base station 12 may count how many times the power disturbances are above the first threshold after the adjusting in S440 and/or above the second threshold after the adjusting in S460. This counting may be performed in a second time period, e.g. 1 hour duration.

Sometimes due to the failure the power disturbance after the adjusting in the action S440 and/or action S460 may still be too high, e.g. above the third threshold.

Action S550. The radio base station 12 may compare the number of times obtained in the action S540 with a fourth threshold.

The fourth threshold may also be configured based on a time duration of the second time period. For instance, the threshold may be 5 if the second time period is 5 TTIs. The fourth threshold may also be updated by the ML algorithm.

Action S560. The radio base station 12 determines that a failure has occurred in the radio base station 12, when the number of times obtained in the action S540 is above the fourth threshold.

By virtue of the embodiments herein, the power disturbance caused by the failure may also be detected, and therefore it is possible to correct the failure based on the detection.

The embodiments herein may be implemented by using either conventional signal processing techniques or a ML algorithm. A technical advantage of the ML algorithm is that it can take into account large number of variables and complex relationships among them, it can also include categorical variables related to the environment and radio site locations. Moreover, the ML algorithm may adapt itself, e.g. the thresholds and/or time periods, over time.

A detailed method actions performed by a radio base station 12 for handling a power disturbance caused by a RU 22a-22i of the radio base station 12 will be described with reference to the ML algorithm as below.

By using the ML algorithm, we can train and evaluate the power disturbance and through that also detect hardware or software faults or capacitor degradation and conditions when it happens. If a hardware failure occurs, the adjusting of the frequencies will be performed more often than previous, and we can thereby detect an anomaly accordingly.

The one or more of the following inputs may be taken by the ML algorithm.
  Input 1: the scheduling information which may comprise allocated carriers information when carrier aggregation is involved, and/or antenna muting information, from the scheduler.
  Input 2: frequency harmonics spectrum (FFT) of the power system spectrum that is generated from radio.
  Input 3: input voltage of each RU 22a-22i, and input voltage at the PSU 29.

The one or more of the following outputs may be given by the ML algorithm.
  Output 1: switching frequency of the DC/DC converter 221 and/or the AC/DC converter 291.
  Output 2: anomaly detection of hardware, software and/or capacitor failure.

The ML algorithm may obtain scheduling information of data traffic associated with the RU 22a. The scheduling information may comprise antenna muting (power ON/OFF of PA) and carrier aggregation (changing frequency of bands). Based on the scheduling information, the ML algorithm may obtain a switching frequency of a DC/DC converter during a time period, e.g. one TTI. The ML algorithm may further evaluate power disturbance based on the history of adjusting the switching frequency.

Different models will be trained to evaluate power disturbance. According to embodiments here it may be proposed to try a variety of ML algorithms, e.g. from simple linear regression to decision tree, Random Forest, Gradient Boosting Trees and finally Deep Neural Networks. Subsequently, a certain number of, e.g. at least three, best models may be selected considering evaluation error, i.e. mean absolute percentage error and mean square error of predicted interference. The selection of the certain number of best models may take the delay caused by computation complexity into account. Since the evaluation is normally done within a short time period, e.g. TTI level, the amount of time consumed by the best models should be very small. Thus, in order to meet the time requirement, both the simple (less accurate) and complex (more accurate) models are needed at the same time. The ML algorithm will use the best models in parallel to evaluate. In case if the output from slower model is unavailable, the output from fast/simple model can be forwarded for the evaluation.

Once the training phase is completed and the best models are selected, the maximum and minimum thresholds of the power disturbance will be obtained. Meanwhile the switching frequencies of the DC/DC converter 221 corresponding to the maximum and a minimum thresholds are also obtained. The maximum and minimum thresholds correspond to two end points of an acceptable or ordinary range of power disturbances which may be selected by the ML algorithm after training.

Furthermore, the ML algorithm may detect an anomaly, i.e. failure, as follows.

Every hardware unit fault may generate a power disturbance on the power bus. Similarly a capacitor dry out may also generate degradation in filtering of a power disturbance on the power bus that will affect a voltage disturbance level, and thereby disturbance Fast Fourier Transform (FFT) harmonics. The ML algorithm may count over time the power disturbances are above the first and/or second thresholds, or how many times adjusting of the switching frequency of the DC/DC converter 221 and/or the AC/DC 291 have been performed. When there is a steep increase, for instance, the number of times that the power disturbances are above the first and/or second thresholds, or the adjusting of the switching frequency of the DC/DC converter 221 and/or the AC/DC 291, is above a third threshold, the ML algorithm may determine that an anomaly, e.g. in hardware, in software or in a capacitor, has happened. The steep increase may be reflected by a threshold which is out of an ordinary range.

Additionally or alternatively, the ML algorithm may count how many times the power disturbances are above the one or more first thresholds after the adjusting in S440 and/or above the second threshold after the adjusting in S460. When there is a steep increase of this number, such as this number is above a fourth threshold, the ML algorithm may also determine that an anomaly in, e.g. hardware, software and/or capacitor has happened.

This embodiment here brings technical advantage of identifying a fault or an anomaly, e.g. in hardware or in software or capacitor dry out, in a quick way.

Figure 7:
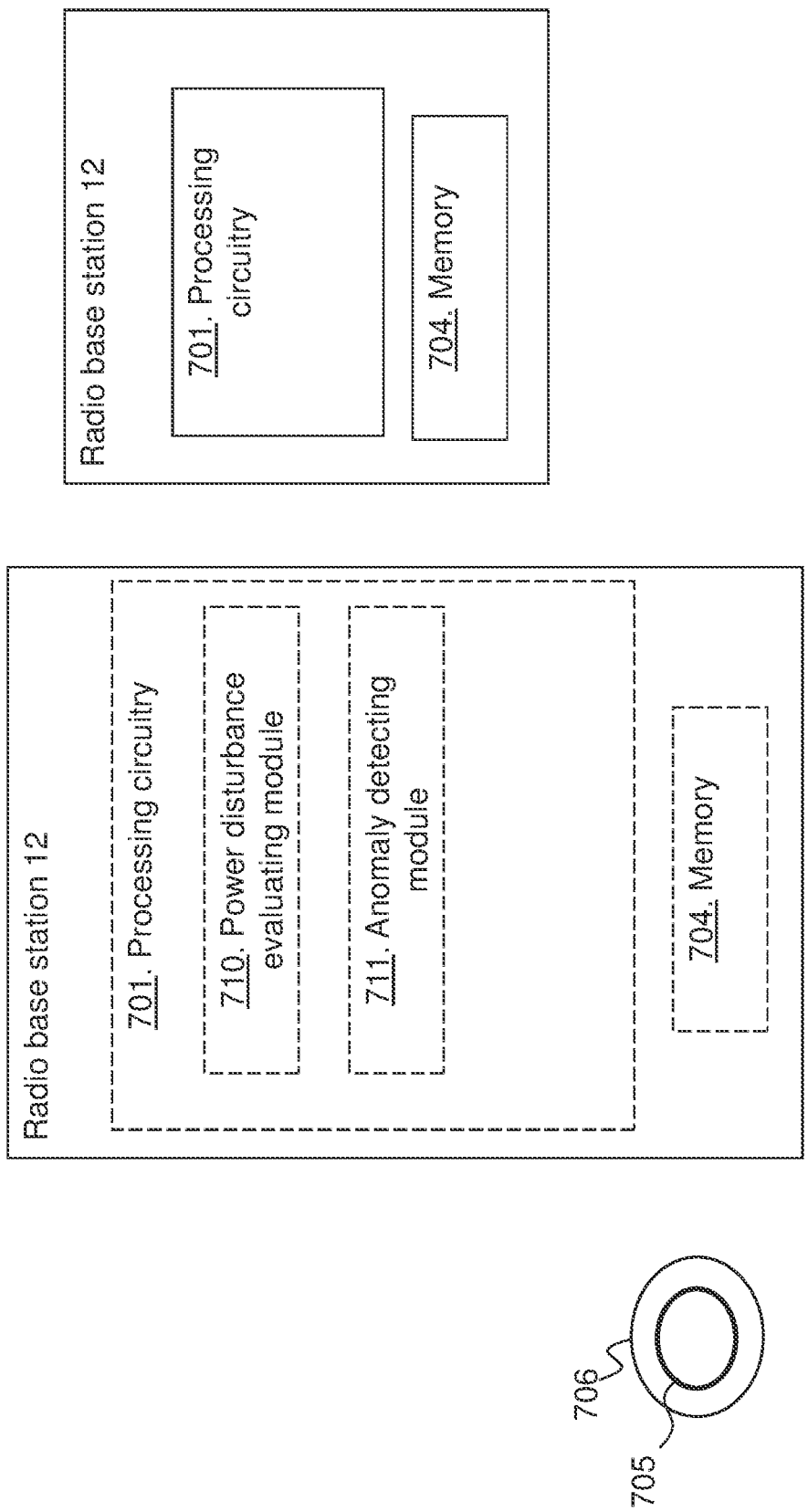
FIG. 7 is a block diagram depicting a radio base station according to embodiments herein.

FIG. 7 is a block diagram depicting the radio base station 12 for handling the power disturbance caused by the RU, e.g. any of the RUs 22a-22i, of the radio base station 12 according to embodiments herein.

It is noted that the radio base station 12 may exclude filter capacitors for power supply. In other words, the radio base station 12 does not need any filter capacitor either for the AC/DC converter 221 or the DC/DC converter 291.

The radio base station 12 may comprise processing circuitry 701, e.g. one or more processors, configured to perform the methods herein.

The radio base station 12 may comprise a power disturbance evaluating module 710. The radio base station 12, the processing circuitry 701, and/or the power disturbance evaluating module 710 is configured to obtain scheduling information of data traffic associated with each RU 22a-22i, compare a power disturbance caused by each RU 22a-22i when handling the data traffic according to the scheduling information with one or more first thresholds, and adjust the switching frequency of the DC/DC converter 221 based on the comparison, wherein the DC/DC converter 221 is comprised in each RU 22a-22i to power each RU 22a-22i.

For instance, the radio base station 12, the processing circuitry 701, and/or the power disturbance evaluating module 710 may be configured to increase the switching frequency of the DC/DC converter 221 when the power disturbance is above a maximum threshold.

The radio base station 12, the processing circuitry 701, and/or the power disturbance evaluating module 710 may further be configured to decrease the switching frequency of the DC/DC converter 221 when the power disturbance is below a minimum threshold.

The RU may be operable in different Radio Access Technologies, RATs, and the one or more first thresholds may be configured per RAT.

The radio base station 12, the processing circuitry 701, and/or the power disturbance evaluating module 710 may further be configured to adjust the switching frequency of the AC/DC converter 291 adapted to power the radio base station 12, when a sum of power disturbances caused by a plurality of RUs 22a-22i of the radio base station 12 in a sector is above the first threshold.

The radio base station 12 may comprise an anomaly detecting module 711. The radio base station 12, the processing circuitry 701, and/or the anomaly detecting module 711 may be configured to determine that a failure has occurred in the radio base station 12, when a number of times that the power disturbances are above the first and/or second thresholds, or the adjustments of the switching frequency of the DC/DC converter 221 and/or the AC/DC (291), is above a third threshold.

The radio base station 12, the processing circuitry 701, and/or the anomaly detecting module 711 may further be configured to determine that a failure has occurred in the radio base station 12, when a number of times that the power disturbances being above the one or more first thresholds after adjusting the switching frequency of the DC/DC converter 221 and/or above a second threshold after adjusting a switching frequency of the AC/DC converter 291, is above a fourth threshold.

As shown in FIG. 2, the radio base station may also comprise one or more RUs (not shown), one or more antennas (not shown), a control unit (not shown) and a BBU (not shown).

In case the radio base station 12 is a main-remote radio base station, the power disturbance evaluating module 710 and the anomaly detecting module 711 may be deployed in any location. For instance, the power disturbance evaluating module 710 and/or the anomaly detecting module 711 may be comprised in the either the MU 20, any of the RUs 22a-22i, or even another location outside of the MU 20, the RUs 22a-22i. However a technical advantage of placing the power disturbance evaluating module 710 and/or the anomaly detecting module 711 in the MU 20, is that less bandwidth is required for obtaining the power disturbances of other RUs. Otherwise, the power disturbance evaluating module 710 will require more bandwidth to obtain the power disturbances of other RRs from the MU 20.

The radio base station may further comprise a memory 704. The memory comprises one or more units to be used to store data on, such as the inputs, outputs, thresholds, time period and/or the related parameters to perform the methods disclosed herein when being executed. Thus, the radio base station may comprise the processing circuitry 701 and the memory 704, said memory 704 comprising instructions executable by said processing circuitry 701 whereby said radio base station is operative to perform the methods herein.

The methods according to the embodiments described herein for the radio base station are respectively implemented by means of e.g. a computer program product 705 or a computer program 705, comprising instructions, i.e., software code portions, which, when executed on at least one processor, cause the at least one processor to carry out the actions described herein, as performed by the radio base station. The computer program product 705 may be stored on a computer-readable storage medium 706, e.g. a disc, USB or similar. The computer-readable storage medium 706, having stored thereon the computer program product 705, may comprise the instructions which, when executed on at least one processor, cause the at least one processor to carry out the actions described herein, as performed by the radio base station. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio base station, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio base stations will appreciate the cost, performance, and maintenance trade-offs inherent in these design choices.

Figure 8:
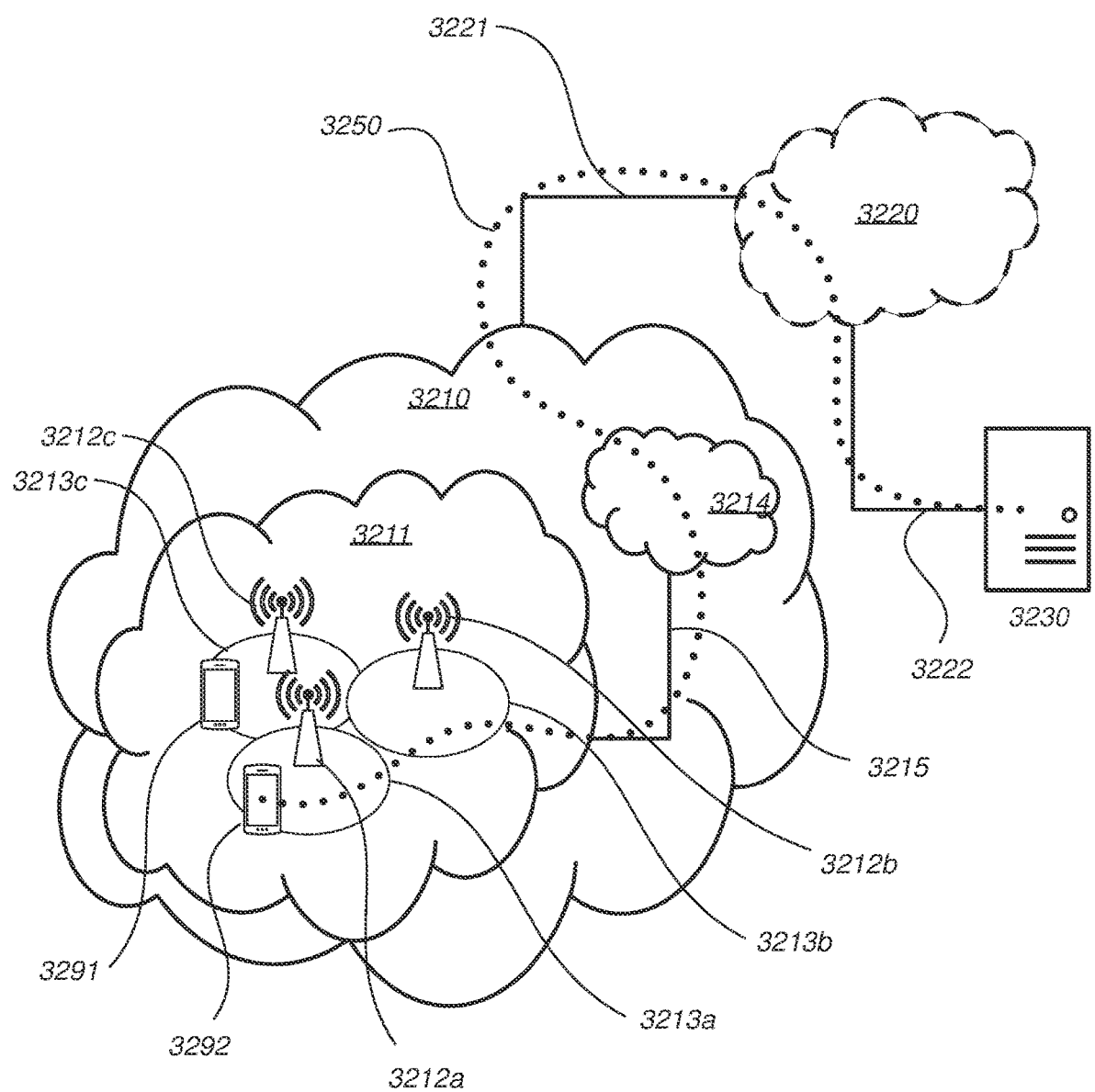
FIG. 8 schematically illustrates a telecommunication network connected via an intermediate network to a host computer.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio base stations herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries.

The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g. handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
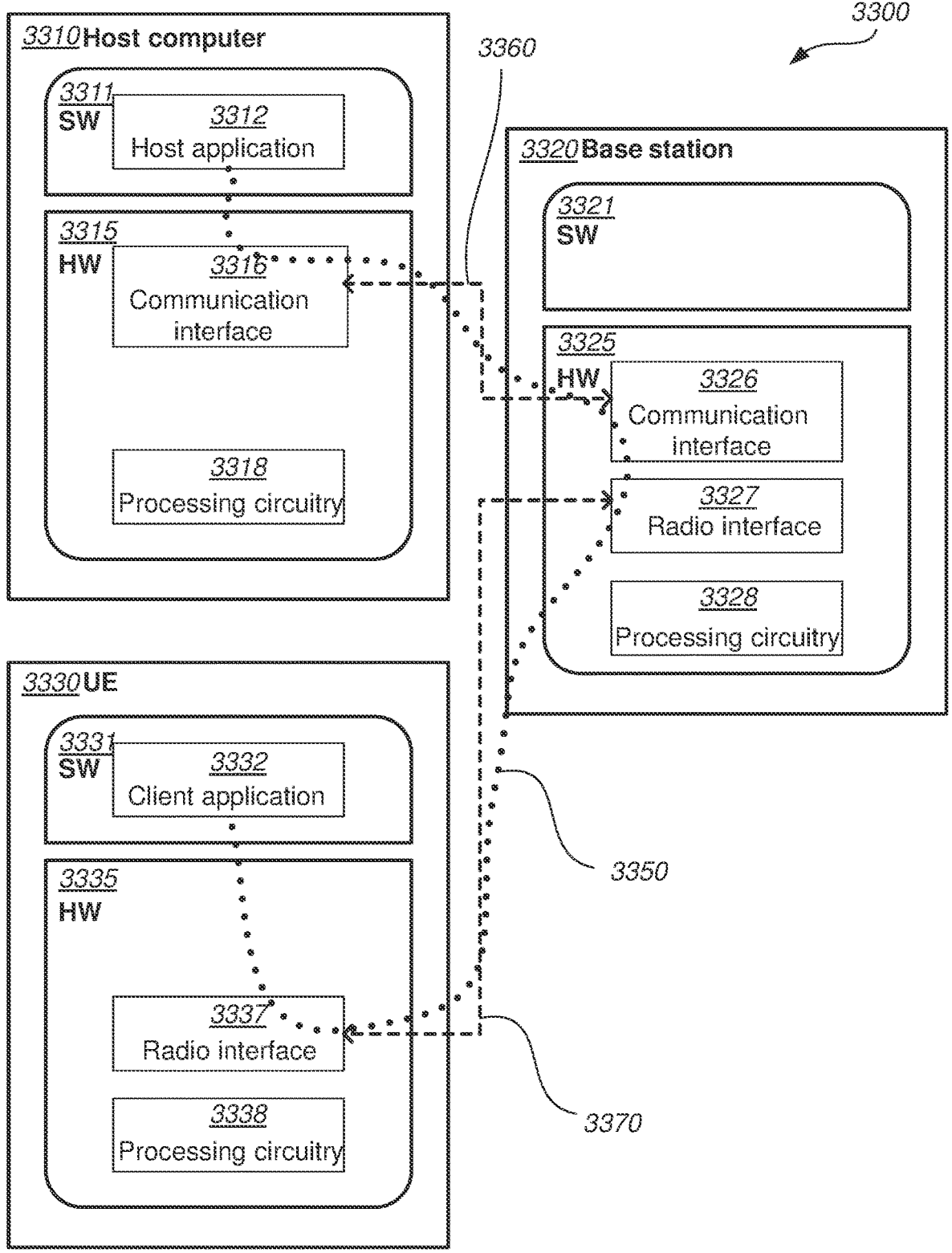
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the user equipment 3330 via the base station 3320, without explicit reference to any intermediary devices and the precise routing ofs via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g. on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve transmissions as number of transitions between states may be reduced and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320.

Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 10:
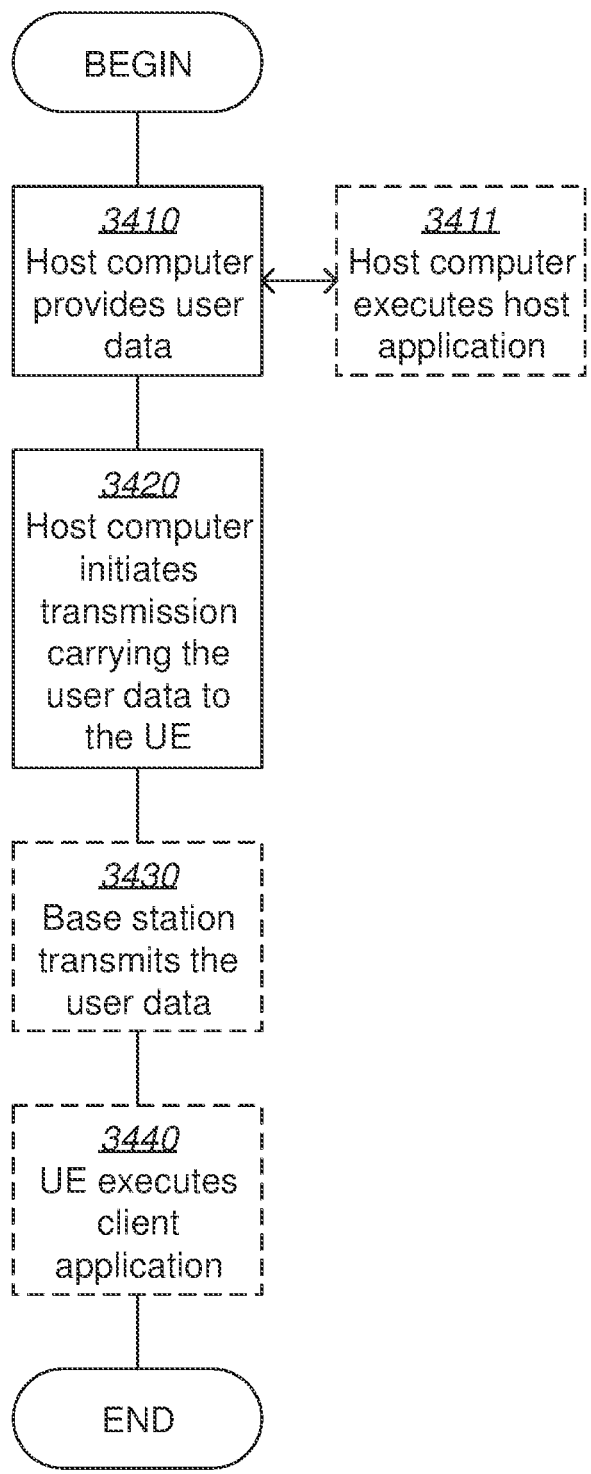
FIG. 10-FIG. 13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 11:
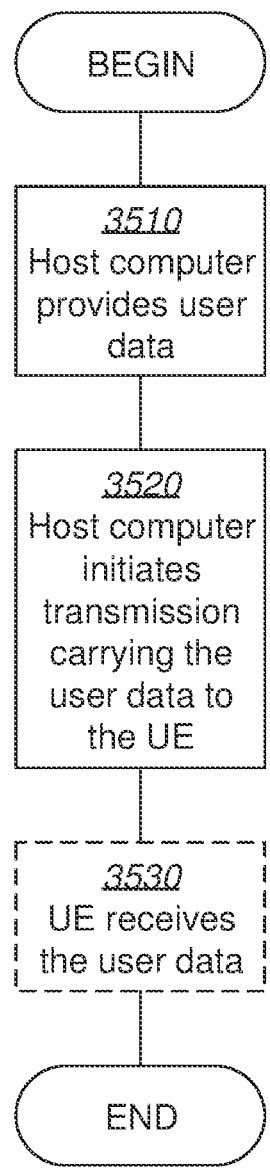

FIG. 11 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 12, 13:
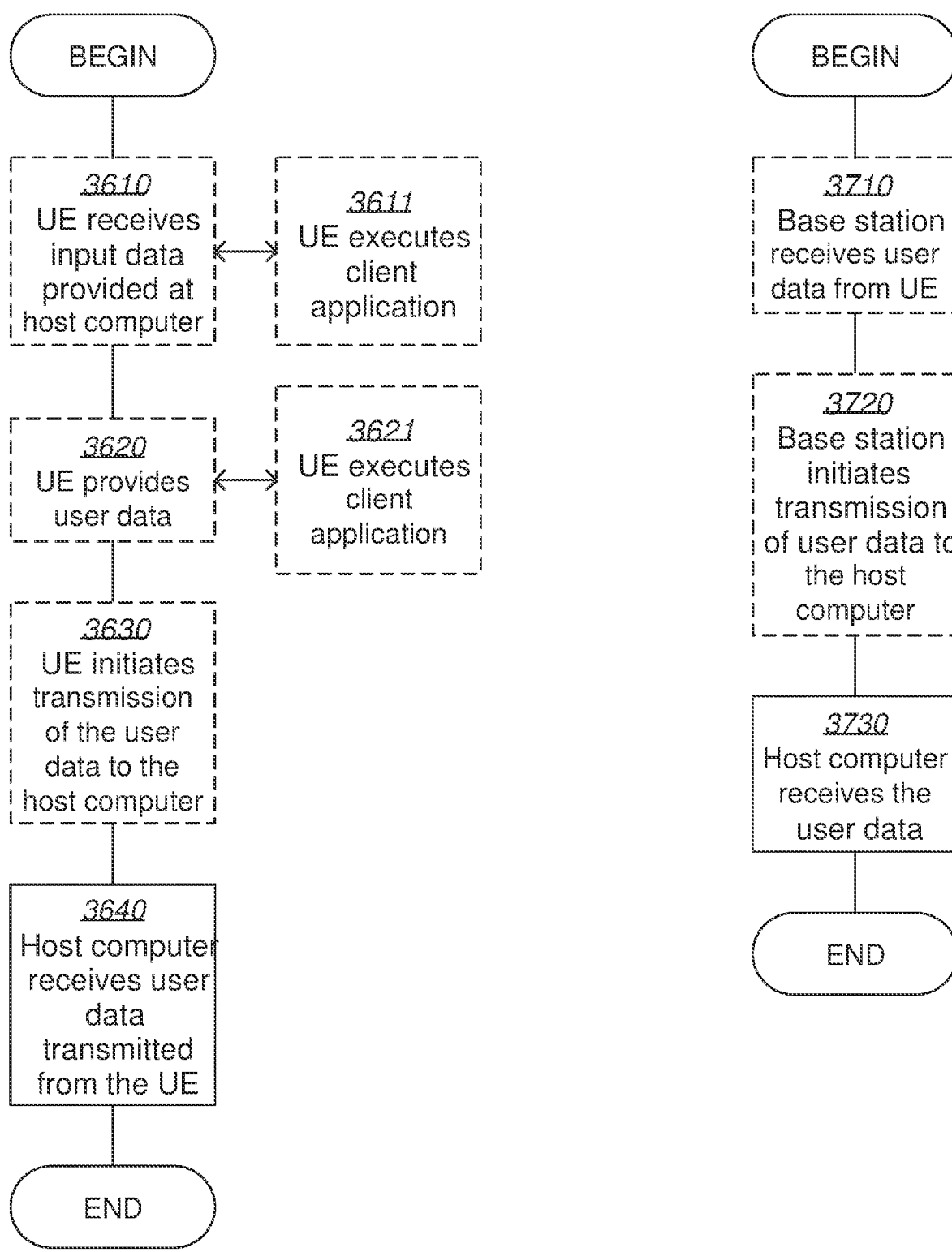

FIG. 12 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIG. 8 and FIG. 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3711, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio base station for handling a power disturbance caused by a radio unit, RU, of the radio base station, the method comprising:
 obtaining scheduling information of data traffic associated with the RU;
 comparing the power disturbance with one or more first thresholds, wherein the power disturbance is caused by the RU adapted to handle the data traffic according to the scheduling information; and
 adjusting a switching frequency of a direct current to direct current, DC/DC converter based on the comparison, wherein the DC/DC converter is comprised in the RU to power the RU.

2. The method according to claim 1, the adjusting comprising:
 increasing the switching frequency of the DC/DC converter when the power disturbance is above a maximum threshold.

3. The method according to claim 1, the adjusting comprising:
 decreasing the switching frequency of the DC/DC converter when the power disturbance is below a minimum threshold.

4. The method according to claim 1, wherein the RU is operable in different Radio Access Technologies, RATs, and the one or more first thresholds are configured per RAT.

5. The method according to claim 1, further comprising:
 adjusting a switching frequency of an alternating current to direct current, AC/DC, converter adapted to power the radio base station, when a sum of power disturbances caused by a plurality of RUs of the radio base station in a sector is above a second threshold.

6. The method according to claim 1, further comprising:
 determining that a failure has occurred in the radio base station, when a number of times of the power disturbances are above the first and/or second thresholds, or adjusting the switching frequency of the DC/DC converter and/or the AC/DC, is above a third threshold.

7. The method according to claim 1, further comprising:
 determining that a failure has occurred in the radio base station, when a number of times of the power disturbances being above the one or more first thresholds after adjusting the switching frequency of the DC/DC converter and/or above a second threshold after adjusting a switching frequency of the AC/DC converter, is above a fourth threshold.

8. A non-transitory computer-readable storage medium, having stored thereon a computer program product comprising instructions which, when executed on at least one processor, cause the at least one processor to carry out the method according to claim 1, as performed by the radio base station.

9. A radio base station for handling a power disturbance caused by a radio unit, RU, of the radio base station, wherein the radio base station is configured to:
 obtain scheduling information of data traffic associated with the RU;
 compare the power disturbance with one or more first thresholds, wherein the power disturbance is caused by the RU adapted to handle the data traffic according to the scheduling information; and
 adjust a switching frequency of a direct current to direct current, DC/DC converter based on the comparison, wherein the DC/DC converter is comprised in the RU to power the RU.

10. The radio base station according to claim 9, further configured to:
 increase the switching frequency of the DC/DC converter when the power disturbance is above a maximum threshold.

11. The radio base station according to claim 9, further configured to:
 decrease the switching frequency of the DC/DC converter when the power disturbance is below a minimum threshold.

12. The radio base station according to claim 9, wherein the RU is operable in different Radio Access Technologies, RATs, and the one or more first thresholds are configured per RAT.

13. The radio base station according to claim 9, further configured to:
 adjust a switching frequency of an alternating current to direct current, AC/DC, converter adapted to power the radio base station, when a sum of power disturbances caused by a plurality of RUs of the radio base station in a sector is above a second threshold.

14. The radio base station according to claim 9, further configured to:
 determine that a failure has occurred in the radio base station, when a number of times of adjusting a switching frequency of the DC/DC converter and/or the AC/DC converter is above a third threshold.

15. The radio base station according to claim 9, further configured to:
 determine that a failure has occurred in the radio base station, when a number of times of the power disturbance being above the one or more first thresholds after adjusting the switching frequency of the DC/DC converter and/or above a second threshold after adjusting a switching frequency of the AC/DC converter, is above a fourth threshold.

16. A radio base station comprising a radio unit (RU) adapted to handle data traffic according to scheduling information, and processing circuitry configured to:
 obtain scheduling information of data traffic associated with the RU;
 compare a power disturbance with one or more first thresholds, wherein the power disturbance is caused by the RU adapted to handle the data traffic according to the scheduling information; and adjust a switching frequency of a direct current to direct current, DC/DC, converter based on the comparison, wherein the DC/DC converter is comprised in the RU to power the RU.

\* \* \* \* \*